US006737151B1

(12) United States Patent
Smith

(10) Patent No.: US 6,737,151 B1
(45) Date of Patent: May 18, 2004

(54) GLASS LAMINATES HAVING IMPROVED STRUCTURAL INTEGRITY AGAINST SEVERE IMPACTS

(75) Inventor: Charles Anthony Smith, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/551,334

(22) Filed: Apr. 18, 2000

Related U.S. Application Data

(60) Provisional application No. 60/130,455, filed on Apr. 22, 1999.

(51) Int. Cl.[7] .............................. B32B 23/02; B32B 7/02; B32B 17/06
(52) U.S. Cl. ....................... 428/192; 428/215; 428/426; 156/99; 156/104
(58) Field of Search ..................... 428/192, 215, 428/426; 156/99, 104

(56) References Cited

U.S. PATENT DOCUMENTS

| | | | |
|---|---|---|---|
| 2,306,314 A | 12/1942 | Lardin | 49/81 |
| 2,353,473 A | 7/1944 | Keslar | 154/2.74 |
| 2,567,353 A | 9/1951 | Ryan | 154/2.77 |
| 3,281,296 A | 10/1966 | Jameson | 156/104 |
| 3,404,134 A | 10/1968 | Rees | 260/78.5 |
| 3,806,400 A | 4/1974 | Laethem | 161/44 |
| 4,284,677 A | 8/1981 | Herliczek | 428/192 |
| 4,799,346 A * | 1/1989 | Bolton et al. | 52/509 |
| 4,799,376 A | 1/1989 | Siedlecki, Jr. et al. | 73/29 |
| 5,002,820 A * | 3/1991 | Bolton et al. | 428/215 |
| 5,778,629 A | 7/1998 | Howes | |
| 5,960,606 A | 10/1999 | Dlubak | 52/786.11 |

FOREIGN PATENT DOCUMENTS

| | | |
|---|---|---|
| BE | 646174 | 7/1964 |
| DE | 2334742 | 1/1974 |
| DE | 3544080 | 6/1987 |
| DE | 29519447 | 3/1996 |
| EP | 0974451 | 1/2000 |
| FR | 2138712 | 1/1973 |
| FR | 2770800 | 5/1999 |
| WO | WO 84/04277 | 11/1984 |
| WO | WO 93/02269 A1 | 2/1993 |
| WO | WO 98/28515 | 7/1998 |

OTHER PUBLICATIONS

PCT International Search Report dated Aug. 17, 2000.

* cited by examiner

*Primary Examiner*—Cynthia H. Kelly
*Assistant Examiner*—L. Ferguson
(74) *Attorney, Agent, or Firm*—Kevin S. Dobson

(57) ABSTRACT

This invention comprises a glazing element having a transparent laminate secured to a structural support, and a process for preparing the same. The laminate comprises at least one layer of glass having self-adhered directly to the layer of glass a layer of thermoplastic polymer having low haze, wherein the layer of thermoplastic polymer is attached to the structural support along the edges of the laminate.

18 Claims, 5 Drawing Sheets

GLASS LAMINATES HAVING IMPROVED STRUCTURAL INTEGRITY AGAINST SEVERE IMPACTS

This application claims benefit of U.S. Provisional Application No. 60/130,455, filed Apr. 22, 1999.

BACKGROUND OF THE INVENTION

1. Field of the Invention

This invention relates to laminated glass structures. This invention particularly relates to laminated glass structures that can withstand severe impact.

2. Description of the Prior Art

Threat-resistant windows and glass structures are known. U.S. Pat. No. 5,960,606 ('606) and U.S. Pat. No. 4,799,376 ('376) each describes laminate windows that are made to withstand severe forces. In International Publication Number WO 98/28515 (IPN '515), for example, a glass laminate is positioned in a rigid channel in which a resilient material adjacent to the glass permits flexing movement between the resilient material and the rigid channel. Other means of holding glazing panels exist such as adhesive tapes, gaskets, putty, and the like can be used to secure panels to a frame.

Prior art windows and glass structures capable of withstanding hurricane-force winds and high force impacts are not trouble-free, however. For example, when subjected to severe hurricane forces the flexing movement in the windows of IPN '515, wherein glass flexes within a rigid channel, gradually pulls the laminate out of the channel resulting in loss of integrity of the structure. In '376, the glass held against the frame can be broken and crushed, causing a loss of structural integrity in the window/frame structure.

SUMMARY OF THE INVENTION

In one aspect, the present invention is a glazing element comprising a transparent laminate and a supporting structure attached to the laminate, the laminate comprising at least one layer of glass bonded directly to an interlayer of a thermoplastic polymer having low haze, wherein the polymer is exposed in such a manner as to allow for attachment of the laminate to the supporting structure, and wherein the laminate is attached to the supporting structure by way of the polymeric interlayer.

In another aspect, the present invention is a process for fabricating a glazing element which includes a glass/thermoplastic polymer laminate in a supporting structure comprising the steps: forming the glass/plastic laminate by positioning a thermoplastic polymer interlayer between two glass plates, the polymer being exposed in such a manner as to allow for attachment of the laminate to the supporting structure; removing air from between the layers of glass and the interlayer; applying heat and external pressure to adhesively bond the glass plates to the interlayer; and, attaching the polymeric interlayer to the supporting structure.

In still another aspect, the present invention is a process for fabricating a glazing element which includes a glass/thermoplastic polymer laminate in a supporting structure comprising the steps: forming the glass/plastic laminate by positioning a thermoplastic polymer interlayer between two glass plates, the polymer being exposed in such a manner as to allow for attachment of the laminate to the supporting structure; removing air from between the layers of glass and the interlayer; applying heat, but not external pressure, to adhesively bond the glass plates to the interlayer; and, attaching the polymeric interlayer to the supporting structure.

In another aspect, the present invention is a glazing structure comprising a transparent laminate having two layers of glass, each glass layer having a tin-side and an air-side, wherein the glass layers are laminated together with a thermoplastic polymer interlayer between the two layers of glass in such a manner that the interlayer is self-adhered to at least one of the glass surfaces, and wherein the interlayer is an ionomer resin.

BRIEF DESCRIPTION OF THE DRAWING

FIGS. 2A and 2H additionally each includes an adhesive layer between the frame and the interlayer.

DETAILED DESCRIPTION

Figure 1:
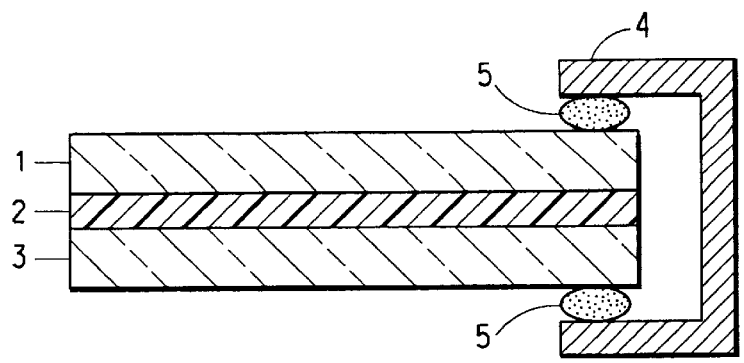
FIG. 1 shows a conventional laminate comprising glass, a thermoplastic interlayer and glass, the glass being attached to a frame through an intermediary adhesive layer.

It has now been found that attaching the interlayer of a glass/thermoplastic laminate (laminate) to a support structure provides glazing elements with improved integrity. The glazing element of this invention comprises a support structure supporting a glazing structure comprising a laminate of at least one layer of glass and at least one thermoplastic polymer layer that is self-adhered directly to at least one surface of the glass. A sheet of the polymer has a high modulus, excellent tear strength and excellent adhesion directly to glass. Preferably the thermoplastic polymer layer is a particular ionomer resin.

The edges of the interlayer material of the laminate can be attached, either directly, or indirectly by some attachment means, to a structure that supports the laminate glazing structure (hereinafter support structure). The support structure can be a frame, or the laminate can be supported by bolts, screws, wires, nails, staples, or any other conventional means for supporting a glazing element. Attachment of the interlayer to the support can be from the top, sides, bottom, or through the interlayer material. While it is preferred that the support structure is a frame that surrounds the glazing structure, other support structures or means are not necessarily excluded.

A laminate of the present invention has excellent durability, impact resistance, toughness, and resistance to cuts by glass. A laminate of the present invention is particularly useful in architectural applications in buildings subjected to hurricanes and wind storms and also as side windows for automobiles and trucks that can be subjected to the repeated attacks by a person attempting to break into the vehicle. A laminate of the present invention that is attached to the frame by way of the interlayer is not torn from the frame after such stress or attack. A laminate of the present invention also has a low haze and excellent transparency. These properties make it useful as architectural glass, including use for reduction of solar rays, sound control, safety, and security, for example.

In one embodiment, a laminate of the present invention comprises at least one layer of glass having self-adhered directly to a surface of the glass an interlayer formed from a thermoplastic polymer having low haze, wherein the outer edges of the interlayer polymer are attached to a surrounding frame. In the process of the present invention the laminate is anchored to the frame by way of the interlayer, which is exposed in such a manner as to allow for attachment of the laminate to the supporting structure.

The interlayer is positioned between the glass plates such that the interlayer is exposed in such a manner that it can be attached to the surrounding frame. The interlayer can be attached to the support structure in either a continuous manner along the perimeter of the laminate. The interlayer can be attached to the structural support in a discontinuous manner at various points around the perimeter of the laminate. Any manner of attaching the laminate to the frame by way of the interlayer is considered to be within the scope of the present invention. For example, the frame surrounding the laminate can contain interlayer material that can bond with the glass surface of the laminate and also with the frame; the interlayer can be mechanically anchored to the frame with a screw, hook, nail, or clamp, for example. Mechanical attachment includes any physical constraint of the interlayer by slotting, fitting, or molding a support to hold the interlayer in place within the structural support. The interlayer can be chemically bonded to the frame with an adhesive material, or by using any combination of mechanical and/or chemical means.

Air can be removed from between the layers of the laminate, and the interlayer can be bonded, or adhered, to the glass plates by applying heat and pressure to the structure. In a preferred embodiment, the interlayer can be bonded without applying increased pressure to the structure.

One preferred laminate of this invention is a transparent laminate of two layers of glass with an intermediate thermoplastic polymer interlayer self-adhered to at least one of the glass surfaces. The interlayer preferably has a Storage Young's Modulus of 50–1,000 MPa (mega Pascals) at 0.3 Hz and 25° C., as determined according to ASTM D 5026-95a.

Preferably, the interlayer of the laminate is a sheet of an ionomer resin, wherein the ionomer resin is a water insoluble salt of a polymer of ethylene and methacrylic acid or acrylic acid, containing about 14–24% by weight of the acid and about 76–86% by weight of ethylene. The ionomer further characterized by having about 10–80% of the acid neutralized with a metallic ion, preferably a sodium ion, and the ionomer has a melt index of about 0.5–50. Melt index is determined at 190° C. according to ASTM D1238. The preparation of ionomer resins is disclosed in U.S. Pat. No. 3,404,134. Known methods can be used to obtain an ionomer resin with suitable optical properties. For example, it is known that increasing the acid content of an ionomer resin can result in improved clarity of the resin.

Haze and transparency of laminates of this invention are measured according to ASTM D-1003-61 using a Hazegard XL211 hazemeter or Hazeguard Plus Hazemeter (BYK Gardner-USA). Percent haze is the diffusive light transmission as a percent of the total light transmission. To be considered suitable for architectural and transportation uses. The interlayer of the laminates generally is required to have a transparency of at least 90% and a haze of less than 5%.

Further improvement can be obtained by selectively orienting the glass surface of the laminate in the direction from which the extreme force is applied. Glass used in laminated glazing structures can be made by the well-known and conventional float glass method, wherein molten glass is cast onto the surface of a liquid tin bath. The surfaces of glass made in this manner are commonly referred to as having a tin-side and an air-side. Orienting the layers of glass such that the tin sides are bonded to the thermoplastic polymer interlayer can reduce glass spalling and removal of glass upon stress or impact.

In constructing the glazing element, it may be most convenient to laminate the glass layer(s) and interlayer using sheets of the same surface dimensions. The edges of the interlayer can be extended past the periphery of the laminate. The interlayer can be attached to a frame, for example, by positioning a strip of interlayer material along the periphery of the laminate. Alternatively, a strip of the interlayer material can be positioned inside the frame, with the strip and edges of the interlayer material in contact. During the laminating process the materials contact each other and adhere to each other when heated.

For the purposes of this application, when the thermoplastic polymer layer is said to be self-adhered directly to glass, this means that there is no intermediate layer between the thermoplastic polymer layer and the glass. For example, there is no primer or thin adhesive layer between the glass and the thermoplastic polymer layer, nor has the surface of the glass or thermoplastic layer been specially treated.

Standard techniques can be used to form the resin interlayer sheet. For example, compression molding, injection molding, extrusion and/or calendaring can be used. Preferably, conventional extrusion techniques are used. In a typical process, an ionomer resin suitable for use in the present invention can include recycled ionomer resin as well as virgin ionomer resin. Additives such a colorants, antioxidants and UV stabilizers can be charged into a conventional extruder and melt blended and passed through a cartridge type melt filter for contamination removal. The melt can be extruded through a die and pulled through calendar rolls to form sheet about 0.38–4.6 mm thick. Typical colorants that can be used in the ionomer resin sheet are, for example, a bluing agent to reduce yellowing or a whitening agent or a colorant can be added to color the glass or to control solar light.

The ionomer resin sheet after extrusion can have a smooth surface but preferably has a roughened surface to effectively allow most of the air to be removed from between the surfaces in the laminate during the lamination process. This can be accomplished for example, by mechanically embossing the sheet after extrusion or by melt fracture during extrusion of the sheet and the like.

The laminate can be prepared according to conventional processes known in the art. In a typical process, the interlayer is placed between two pieces of annealed float glass of dimension 12"×12" (305 mm×305 mm) and 2.5 mm nominal thickness, which have been washed and rinsed in demineralized water. The glass/interlayer/glass assembly is then heated in an oven set at 90–100° C. for 30 minutes. Thereafter, it is passed through a set of nip rolls (roll pressing) so that most of the air in the void spaces between the glass and the interlayer may be squeezed out, and the edge of the assembly sealed. The assembly at this stage is called a pre-press. The pre-press is then placed in an air autoclave where the temperature is raised to 135° C. and pressure to 200 psig (14.3 bar). These conditions are maintained for 20 minutes, after which, the air is cooled while no more air is added to the autoclave. After 20 minutes of cooling when the air temperature in the autoclave is less than 50° C., the excess air pressure is vented.

In a preferred embodiment, a glass sheet, an ionomer resin sheet and a second glass sheet can be laminated together using heat, pressure, and vacuum to remove air. The edges of the resin sheet can be extended into the frame by including a strip of resin sheet in the frame from each edge of the glass. The ionomer resin sheet can be positioned between two glass plates under a vacuum (a vacuum bag or vacuum ring can be used), and can be heated from about 25 to about 135° C. to obtain an assembly. The assembly is held at this temperature for from about 15 minutes to about 2.0 hours and then cooled to ambient temperature, generally to about 25° C. or less. In this process the edges of the resin sheet can be fused with the resin sheet in the frame creating a monolithic structure. Alternatively, the glass sheets and the ionomer can be laminated according to the same process, except that ambient atmospheric pressure is used.

FIG. 1 shows a conventional laminate comprising glass (1), a thermoplastic interlayer (2) and glass (3), the glass being attached to a frame (4) through an intermediary adhesive layer (5).

Figure 2A:
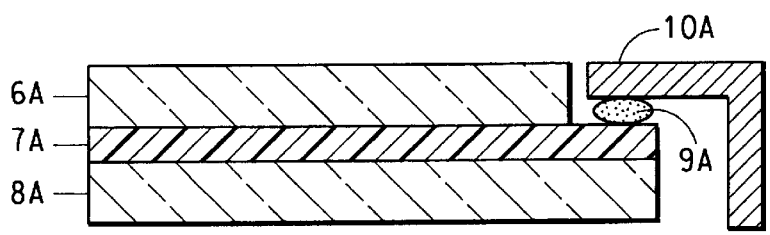
FIGS. 2A–2H show various glass/interlayer/glass laminate assemblies wherein the interlayer is exposed in such a manner as to allow for attachment of the laminate to the frame.
Figure 2B:
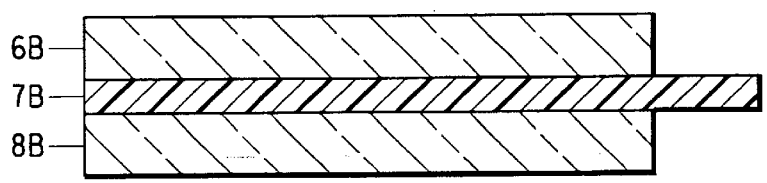
Figure 2C:
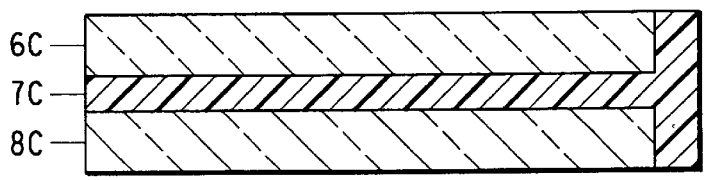
Figure 2D:
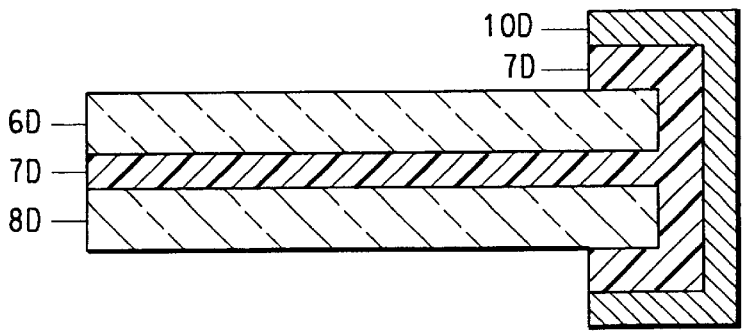
Figure 2E:
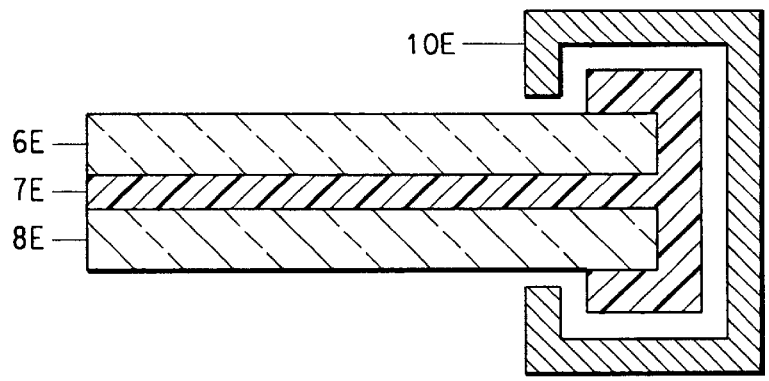
Figure 2F:
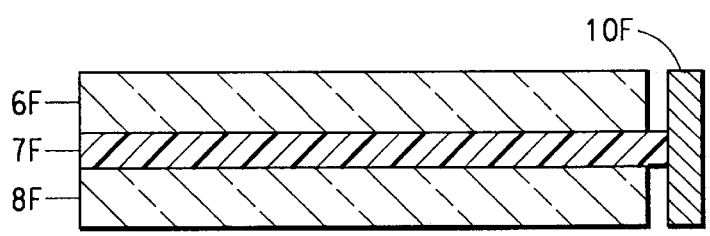
Figure 2G:
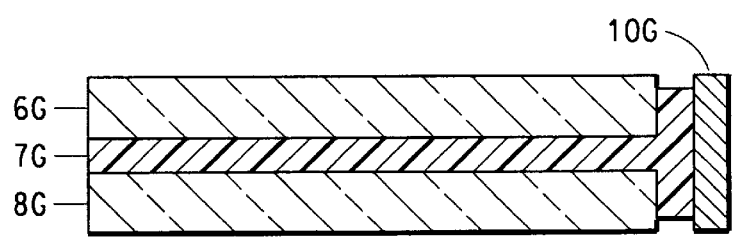
Figure 2H:
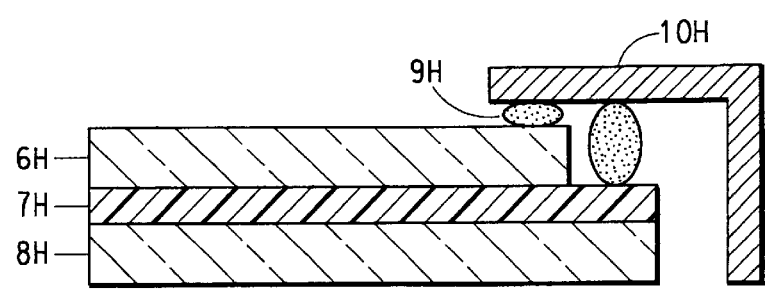
Figure 3A:
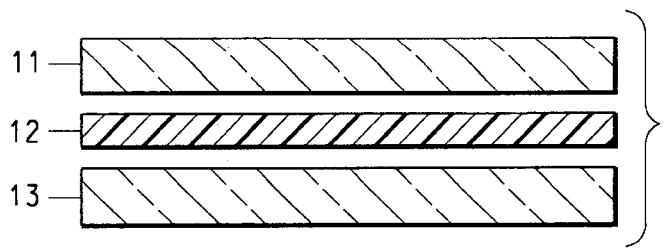
FIGS. 3A–3D depict a process for preparing a glass/interlayer/glass laminate assembly wherein the laminate is produced by removing air from the laminate using vacuum, and wherein the construction of the frame enables connection of the laminate/frame assembly to a vacuum source by way of a channel, and further wherein the laminate frame assembly can be disconnected from the vacuum source to obtain a glass/interlayer/glass laminate assembly that is securely attached to a frame.
Figure 3B:
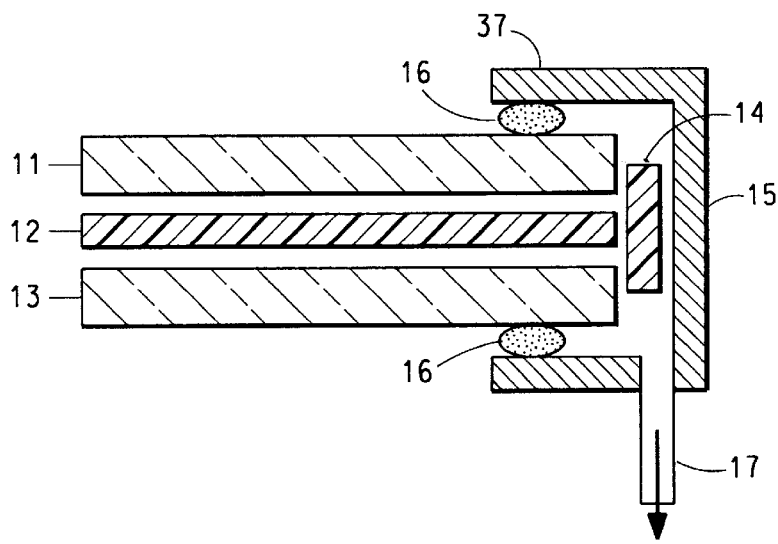
Figure 3C:
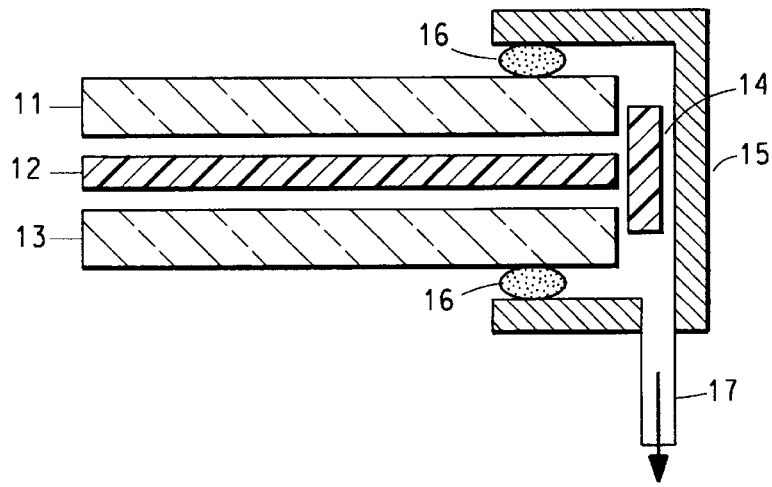
Figure 3D:
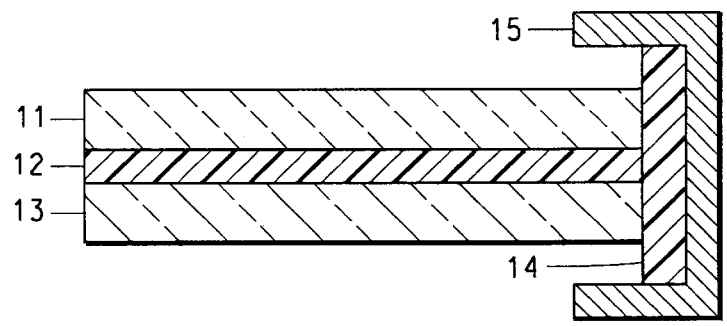

FIGS. 2A–2H show various glass (6)/interlayer (7)/glass (8) laminate assemblies wherein the interlayer extends beyond at least one panel of glass, such that the laminate assemblies can be attached to a frame (10) by way of the interlayer. FIG. 2A additionally includes an adhesive layer (9A) between the frame and the interlayer. FIG. 2H is similar to 2A, except that it shows the frame (10H) bonded to the glass with an intermediate adhesive layer (9H). The adhesive can be any adhesive conventional in the art or, alternatively, can be interlayer material.

FIGS. 3A–3D depict a process for preparing a glass(11)/interlayer(12)/glass(13) laminate assembly wherein the laminate is produced by removing air from the laminate using vacuum, and wherein the construction of the frame enables connection of the laminate/frame assembly to a vacuum source by way of a channel (17), and further wherein the laminate frame assembly can be disconnected from the vacuum source to obtain a glass/interlayer/glass laminate assembly that is securely attached to a frame.

Figure 4:
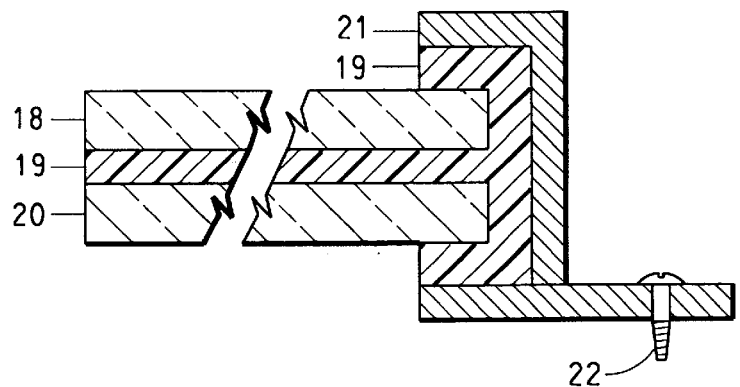
FIG. 4 depicts a frame/laminate assembly wherein the interlayer fills at least part of the void-space between the frame and the surface of the glass layers.

FIG. 4 depicts a frame/laminate assembly wherein the interlayer (19) fills at least part of the void-space between the frame (21) and the surface of the glass layers (18, 20), with a screw (22) to secure the frame (21) to a support.

Figure 5:
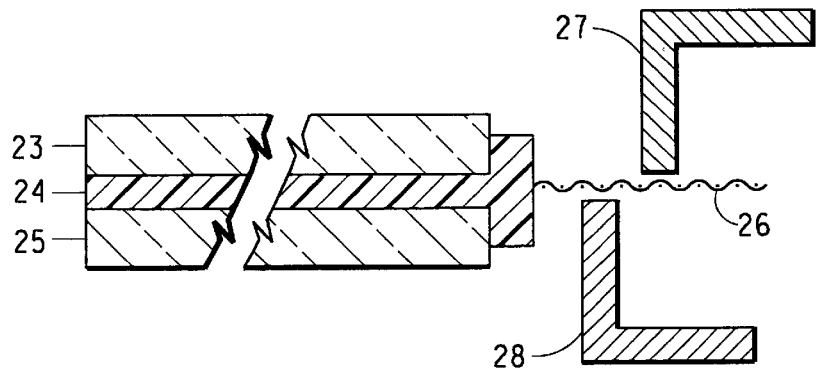
FIG. 5 depicts a glass/interlayer/glass configuration wherein the interlayer is attached to a wire mesh or other attachment means, which is in turn attached to the frame.

FIG. 5 depicts a glass(23)/interlayer(24)/glass(25) configuration wherein the interlayer (24) is attached to a wire mesh or other attachment means (26), which is in turn anchored to the frame (27, 28).

Figure 6:
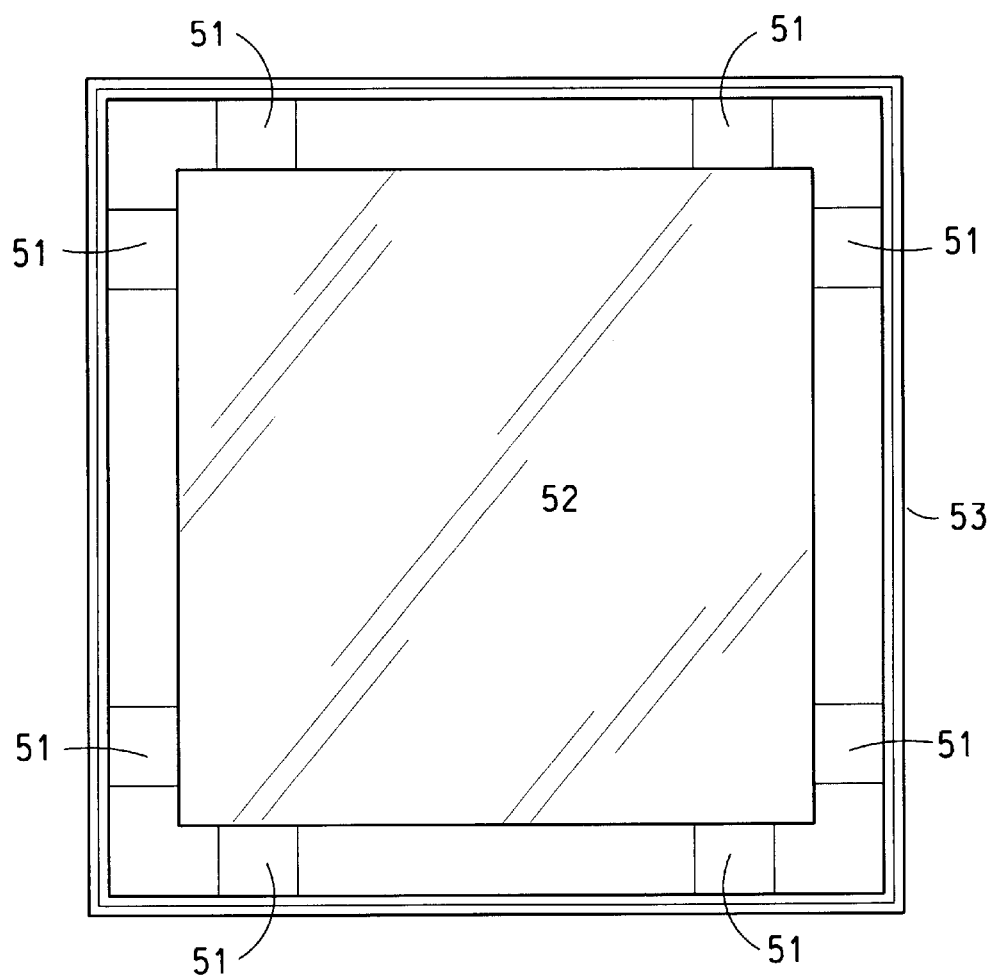
FIG. 6 shows a stepwise process for attaching glazing or laminate to a frame by way of an interlayer, without requiring that the entire periphery of the polymer be attached to the frame.

FIG. 6 shows how glazing structure or laminate (52) can be anchored to a frame by way of an interlayer (51) without requiring that all of the edges of the polymer be attached to the frame (53).

The Figures do not represent all variations thought to be within the scope of the present invention. Any variation of glass/interlayer/glass laminate assembly wherein a frame can be attached to the interlayer—either directly or indirectly through an intermediary layer, for example an adhesive layer, is believed to be within the scope of the present invention. In a preferred embodiment, wherein the two layers of glass are of different lengths, as in either FIG. 2A or FIG. 2H, the short glass layer (6H) is not more than 6 milimeters shorter than the longer layer of glass (8H). Such a structure can be more reliable to uphold its structural integrity than a structure wherein the frame is attached directly to the glass.

For architectural uses and for uses in transportation applications such as automobiles, trucks and trains, a laminate can have two layers of glass and, self-adhered to the glass, an interlayer of a thermoplastic polymer. A laminate of the present invention can have an overall thickness of about 3–30 mm. The interlayer can have a thickness of about 0.38–4.6 mm and each glass layer can be at least 1 mm thick. In a preferred embodiment, the interlayer is self-adhered directly to the glass, that is, an intermediate adhesive layer or coating between the glass and the interlayer is not used. Other laminate constructions can be used such as, for example, multiple layers of glass and thermoplastic interlayers; or a single layer of glass with a thermoplastic polymer interlayer, having adhered to the interlayer a layer of a durable transparent plastic film. Any of the above laminates can be coated with conventional abrasion resistant coatings that are known in the art.

The frame can be fabricated from a variety of materials such as, for example: wood; aluminum; steel; and various strong plastic materials including polyvinyl chloride and nylon. Depending on the material used and the type of installation, the frame may or may not be required to overlay the laminate in order to obtain a fairly rigid adhesive bond between the frame and the laminate interlayer.

The frame can be selected from the many available frame designs in the glazing art, with the requirement that the interlayer can be secured to the frame. The interlayer can be attached, or secured, to the frame with or without use of an adhesive material. FIG. 2A depicts the use of an adhesive, for example. In FIG. 2D, the edges of interlayer 2D are self-adhered securely to frame 10D without the use of an additional adhesive. It has been found that an interlayer made from ionomer resin self-adheres securely to most frame materials, such as wood, steel, aluminum and plastics. In some applications it may be desirable to use additional fasteners such as screws, bolts, and clamps along the edge of the frame. Any means of anchoring the interlayer to the frame is suitable for use in the present invention.

An interlayer of the present invention has a Storage Young's Modulus of from about 50 to about 1,000 MPa (mega Pascals) and preferably form about 100 to about 500 MPa, as determined according to ASTM D 5026-95a. The interlayer should remain in the 50–1,000 MPa range of its Storage Young's Modulus at temperatures up to 40° C.

In preparing the glazing elements of this invention, autoclaving can be omitted. Steps well known in the art such as roll pressing (1), vacuum ring or bag pre-pressing (2), or vacuum ring or bagging (3), can be used to prepare the laminates of the present invention. The layers are brought into intimate contact and processed into a final laminate, which is free of bubbles and has good optics and adequate properties to insure laminate performance over the service life of the application. In these processes the objective is to squeeze out or force out a large portion of the air which is between the glass and plastic layer(s). In one embodiment the frame can serve as a vacuum ring. The application of external pressure, in addition to driving out air, brings the glass and plastic layers into direct contact and adhesion develops.

For architectural uses in coastal areas, the laminate of glass/interlayer/glass must pass a simulated hurricane impact and cycling test which measures resistance of a laminate to debris impact and wind pressure cycling. A currently acceptable test is performed in accordance to the South Florida Building Code Chapter 23, section 2315 Impact tests for wind born debris. Fatigue load testing is determined according to Table 23-F of section 2314.5, dated 1994. This test simulates the forces of the wind plus air born debris impacts during severe weather, e.g., a hurricane. A sample 35 inches×50 inches (88.9×127 cm) of the laminate is tested. The test consists of two impacts on the laminate (one in the center of the laminate sample followed by a second impact in a corner of the laminate). The impacts are done by launching a 9-pound (4.1 kilograms) board nominally 2 inches (5 cm) by 4 inches (10 cm) and 8 feet (2.43 meters) long at 50 feet/second (15.2 meters/second) from an air pressure cannon. If the laminate survives the above impact sequence, it is subjected to an air pressure cycling test. In this test, the laminate is securely fastened to a chamber. In the positive pressure test, the laminate with the impact side outward is fastened to the chamber and a vacuum is applied to the chamber and then varied to correspond with the cycling sequences set forth in the following Table 1. The pressure cycling schedule, as shown in Table 1 below, is specified as fraction of a maximum pressure P. In this test P equals 70 pounds per square foot (3360 Pascals). Each cycle of the first 3500 cycles and subsequent cycles is completed in about 1–3 seconds. On completion of the positive pressure test sequence, the laminate is reversed with the impact side facing inward to the chamber for the negative pressure portion of the test and a vacuum is applied corresponding to the following cycling sequence. The values are expressed as negative values (−).

TABLE 1

| Number of Air Pressure Cycles | Pressure Schedule* | Pressure Range [pounds per square foot (Pascals)] |
|---|---|---|
| Positive Pressure (inward acting) | | |
| 3,500 | 0.2 P to 0.5 P | 14 to 35 (672–1680 Pascals) |
| 300 | 0.0 P to 0.6 P | 0 to 42 (0–2016 Pascals) |
| 600 | 0.5 P to 0.8 P | 35 to 56 (1680–2688 Pascals) |
| 100 | 0.3 P to 1.0 P | 21 to 70 (1008–3360 Pascals) |
| Negative Pressure (outward acting) | | |
| 50 | −0.3 P to −1.0 P | −21 to −70 (−1008 to −3360 Pascals) |
| 1,060 | −0.5 P to −0.8 P | −35 to −56 (−1680 to −2688 Pascals) |
| 50 | 0.0 P to −0.6 P | −0 to −42 (0 to −2016 Pascals) |
| 3,350 | −0.2 P to −0.5 P | −14 to −35 (−672 to −1680 Pascals) |

*Absolute pressure level where P is 70 pounds per square foot (3360 Pascals).

A laminate passes the impact and cycling test when there are no tears or openings over 5 inches (12.7 cm) in length and not greater than 1/16 inch (0.16 cm) in width.

The Examples are for illustrative purposes only, and are not intended to limit the scope of the invention.

EXAMPLE 1

Six separate glass laminates are prepared. All laminates used a 90 mil (2.3 mm) thick interlayer of an ionomer resin composed of 81% ethylene, 19% methacrylic acid, 37% neutralized with sodium ion and having a melt index of 2 and 2 layers of glass, each 3 mm in thickness. The ionomer resin is available as Surlyn® ionomer resin made by E.I. Du Pont de Nemours and Company. The ionomer resin interlayer has a Storage Young's Modulus of 361 MPa.

All six laminates are prepared by placing the interlayer between the glass panels. Each of the glass panels is washed with deionized water. The laminates are placed in an air autoclave at 220 PSIG (1.6 MPa) pressure at 135° C. for 30 minutes. The laminates are 35 inches (88.9 cm) high by 50 inches (127 cm) wide. Laminates 1–3 are placed in a window frame glazed with a silicone sealant (Dow Corning type 995) as depicted in FIG. 1. Laminates 4–6 are each placed into a window frame using the same procedure except that a strip of the interlayer material was placed in a channel surrounding the laminate so that it contacted the edges of the interlayer, as in FIG. 2D. Each of the laminates is tested according to the Florida impact and cycling test sequence. In the impact test a missile of a 9-pound (4.1 kilograms) pine board nominally 2 inches (5 cm) by 4 inches (10 cm) and 8 feet (2.43 meters) long is propelled against the laminate at 50 feet/second (15.2 meters/second) from an air pressure cannon striking the laminate "normal" to its surface. Each of the laminates is subjected to two impacts in two different locations of the laminate, which fractures the glass. The results of the test are shown below in Table 2 below.

TABLE 2

Laminated of Ionomer Resin IMPACT SEQUENCE

| | | #1 IMPACT | | | #2 IMPACT | |
|---|---|---|---|---|---|---|
| Ex. | Location | Speed fps (mps) | Re-sult | Location | Speed (fps) (mps) | Re-sult |
| 1 | Bottom Center | 50.8 (15.5) | P* | Bottom Corner | 49.9 (15.2) | P |
| 2 | Center Mullion | 50.7 (15.5) | P | Bottom Corner | 50.8 (15.5) | P |
| 3 | Center Mullion | 49.9 (15.2) | P | Bottom Center | 50.8 (15.5) | P |
| 4ᶜ | Bottom Center | 50.6 (15.4) | P | Bottom Corner | 51.0 (15.6) | P |
| 5ᶜ | Center Mullion | 50.2 (15,3) | P | Bottom Corner | 50.4 (15.4) | P |
| 6ᶜ | Center Mullion | 50.3 (15.3) | P | Bottom Center | 50.1 (15,3) | P | fps = feet per second  mps = meters per second
*P = Passed
ᶜAn example of the present invention.

Each of the laminates 1–6 passed the impact test. The glass was fractured but the laminate remained intact.

To evaluate the post glass fracture intrusion resistance of each of the laminates, each of the laminates 1–6 after the impact test is subjected to an air pressure cycling test as described above in the specification except the air pressure cycling sequence as shown in Table 3 is used. The results of this test are shown below in Table 3 below.

TABLE 3

| | AIR PRESSURE CYCLING SEQUENCE | | | | | |
|---|---|---|---|---|---|---|
| | POSITIVE PRESSURE INWARD ACTING | | | NEGATIVE PRESSURE OUTWARD ACTING | | |
| Laminate | Pressure (lbs/ft$^2$) | Cycles | Result | Pressure (lbs/ft$^2$) | Cycles | Result |
| 1 | 70 | 4500 | Passed | 70 | <1000 | Failed |
| 2 | 70 | 4500 | Passed | 70 | <1000 | Failed |
| 3 | 70 | 4500 | Passed | 70 | <1000 | Failed |
| 4 | 70 | 4500 | Passed | 70 | 4500 | Passed |
| 5 | 70 | 4500 | Passed | 70 | 4500 | Passed |
| 6 | 70 | 4500 | Passed | 70 | 4500 | Passed |

What is claimed is:

1. A glazing element comprising a transparent laminate and a supporting structure attached to the laminate by way of a thermoplastic polymer interlayer, wherein said thermoplastic polymer is an ionomer resion obtained by copolymerizing ethylene and methacrylic acid or ethylene and acrylic acid, the laminate comprising at least one layer of glass bonded directly to the interlayer on at least one glass surface, wherein the interlayer extends beyond the edge of the laminate in such a manner as to allow for attachment of the extended portion of the interlayer of the supporting structure.

2. The element of claim 1 wherein said ionomer resin consists essentially of a water insoluble sodium salt of a polymer of ethylene and methacrylic acid or acrylic acid containing 14–24% by weight of the acid and having about 30–50% by weight of the acid neutralized with sodium ion and the ionomer resin has a melt index of about 0.5–50.

3. The glazing element of claim 2 wherein two layers of float glass are present, each having a tin-side and an air-side, and wherein at least one glass layer is oriented with the tin-side being bonded to the layer of ionomer resin.

4. The glazing element of claim 1 wherein two layers of float glass, each having a tin-side and an air-side, are each oriented with the tin sides of the glass layers bonded to the layer of thermoplastic polymer.

5. The glazing element of any one of claims 1–4, wherein the glazing element is configured as shown in FIG. 2A.

6. The glazing element of any one of claims 1–4, wherein the glazing element is configured as shown in FIG. 2B.

7. The glazing element of any one of claims 1–4, wherein the glazing element is configured as shown in FIG. 2C.

8. The glazing element of any one of claims 1–4, wherein the glazing element is configured as shown in FIG. 2D.

9. The glazing element of any one of claims 1–4, wherein the glazing element is configured as shown in FIG. 2E.

10. The glazing element of any one of claims 1–4, wherein the glazing element is configured as shown in FIG. 2F.

11. The glazing element of any one of claims 1–4, wherein the glazing element is configured as shown in FIG. 2G.

12. The glazing element of any one of claims 1–4, wherein the glazing element is configured as shown in FIG. 2H.

13. The glazing element of any one of claims 1–4, wherein the glazing element is configured as shown in FIG. 4.

14. The glazing element of any one of claims 1–4, wherein the glazing element is configured as shown in FIG. 5.

15. The glazing element of any one of claims 1–4, wherein the glazing element is configured as shown in FIG. 6.

16. A process for fabricating a glazing element which includes a glass/thermoplastic polymer laminate according to claim 1 comprising the steps: forming the glass/plastic laminate by positioning a thermoplastic polymer interlayer between two glass plates, the polymer being exposed in such a manner as to allow for attachment of the laminate to the supporting structure; removing air from between the layers of glass and the interlayer; applying heat and external pressure to adhesively bond the glass plates to the interlayer; and, attaching the polymeric interlayer to the supporting structure.

17. A process for fabricating a glazing element which includes a glass/thermoplastic polymer laminate according to claim 1 comprising the steps: forming the glass/plastic laminate by positioning a thermoplastic polymer interlayer between two glass plates, the polymer being exposed in such a manner as to allow for attachment of the laminate to the supporting structure; removing air from between the layers of glass and the interlayer; applying heat, but not external pressure, to adhesively bond the glass plates to the interlayer; and, attaching the polymeric interlayer to the supporting structure.

18. A transparent laminate article comprising at least one layer of glass bonded directly to a thermoplastic polymer interlayer on at least one glass surface, wherein: (1) the interlayer is an ionomer resin that extends beyond at least one edge of the laminate; (2) the interlayer consists essentially of a water insoluble sodium salt of a polymer of ethylene and methacrylic acid or acrylic acid containing 14–24% by weight of the acid and having about 30–50% by weight of the acid neutralized with sodium ion; (3) the ionomer resin has a melt index of about 0.5–50; and (4) the ionomer resin has a modulus in the range of from about 50 to about 1,000 MPa at the conditions of 0.3 Hz and 25° C., as determined according to ASTM D 5026-95a.

\* \* \* \* \*